United States Patent [19]

Fish

[11] Patent Number: 5,368,242

[45] Date of Patent: Nov. 29, 1994

[54] BUNK SILO UNLOADER

[76] Inventor: David Fish, 2831 Stout Rd., Ovid, N.Y. 14521

[21] Appl. No.: 151,144

[22] Filed: Nov. 12, 1993

[51] Int. Cl.$^5$ .......................... B02C 9/04; B02C 18/06
[52] U.S. Cl. .................... 241/101.7; 241/277
[58] Field of Search .................. 241/101.2, 101.7, 277, 241/282.1

[56] References Cited

U.S. PATENT DOCUMENTS

| | | | |
|---|---|---|---|
| 3,779,408 | 12/1973 | Ivie | 241/101.7 X |
| 3,961,718 | 6/1976 | Lucas | 241/101.7 X |
| 3,985,305 | 10/1976 | Williamson et al. | 241/101.7 X |
| 4,157,164 | 6/1979 | Helm et al. | 241/101.7 X |
| 4,367,855 | 1/1983 | von der Heide | 241/101.7 |
| 4,923,128 | 5/1990 | Ostrowski | 241/101.7 |
| 5,236,343 | 8/1993 | Pinto et al. | 241/101.7 X |

Primary Examiner—Timothy V. Eley
Attorney, Agent, or Firm—Katherine McGuire

[57] ABSTRACT

A silo unloader for comminuting and gathering silage from a bunk silo detachably connects to the forward end of a hydraulically operated agricultural vehicle. The silo unloader is also hydraulically operated via controls in the vehicle cab and includes a cylindrical drum rotatably carried between a pair of vertically oriented screw jacks. A pair of circular cutting teeth are positioned at either end of the drum and are rotatable therewith. The screw jacks are operable to rotate in synchronous and alternating directions with the drum being attached thereto via a pair of nut elements which are threadedly engaged to the screw jacks. As the screw jacks rotate in the clockwise and counter-clockwise directions, the nut elements and the drum travel downwardly and upwardly thereon, respectively.

13 Claims, 19 Drawing Sheets

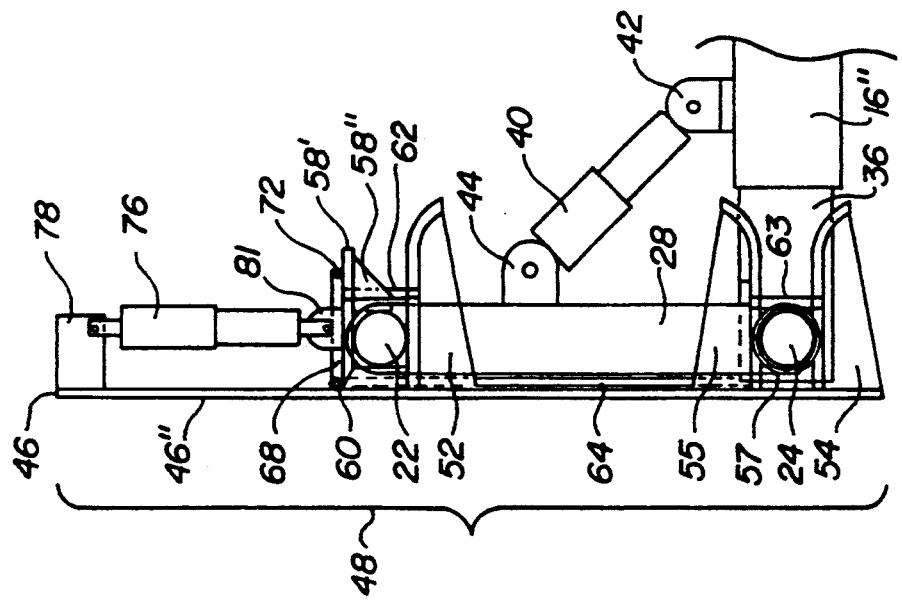
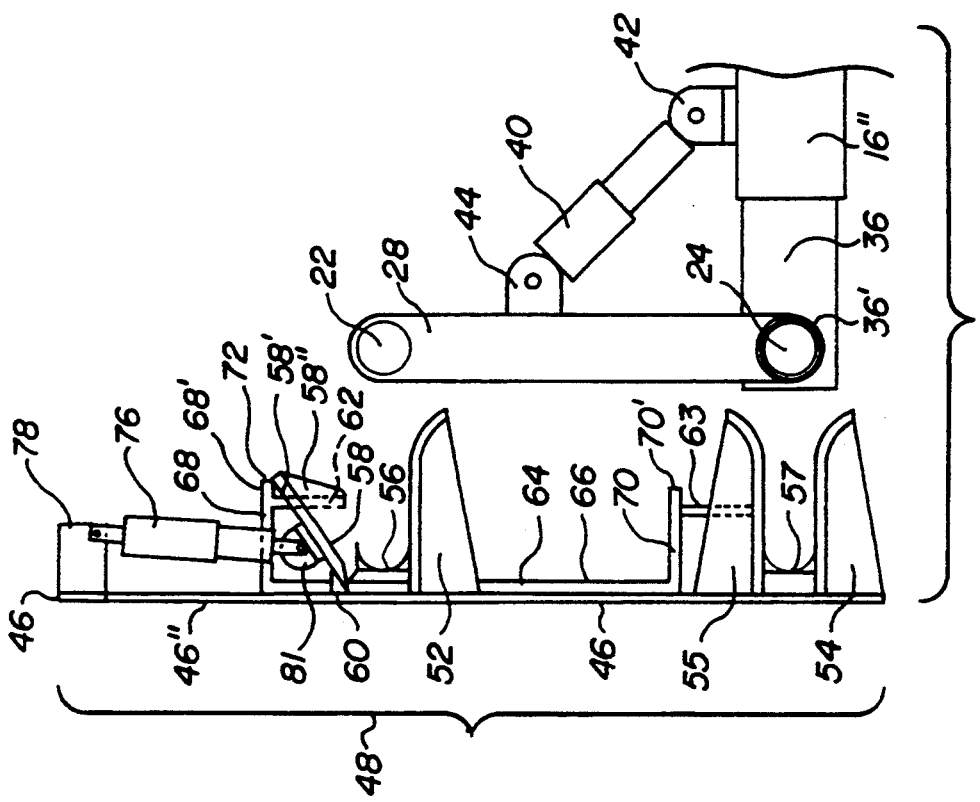

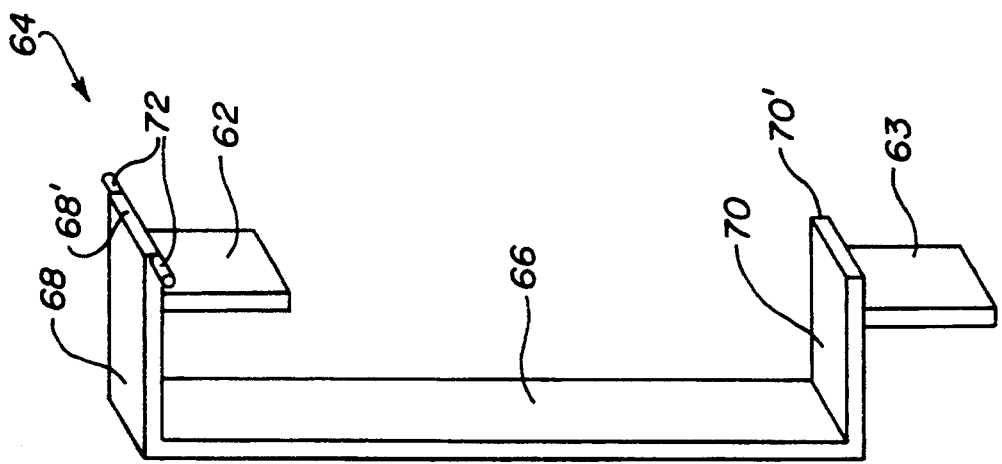
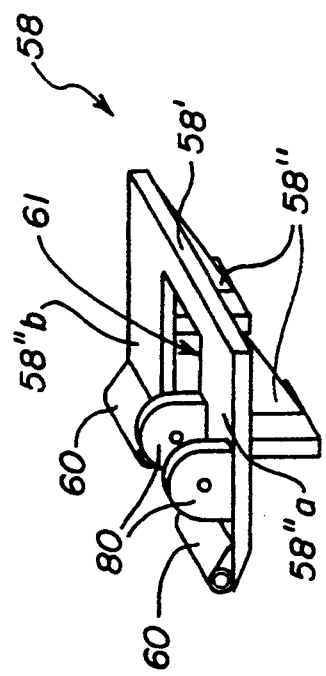

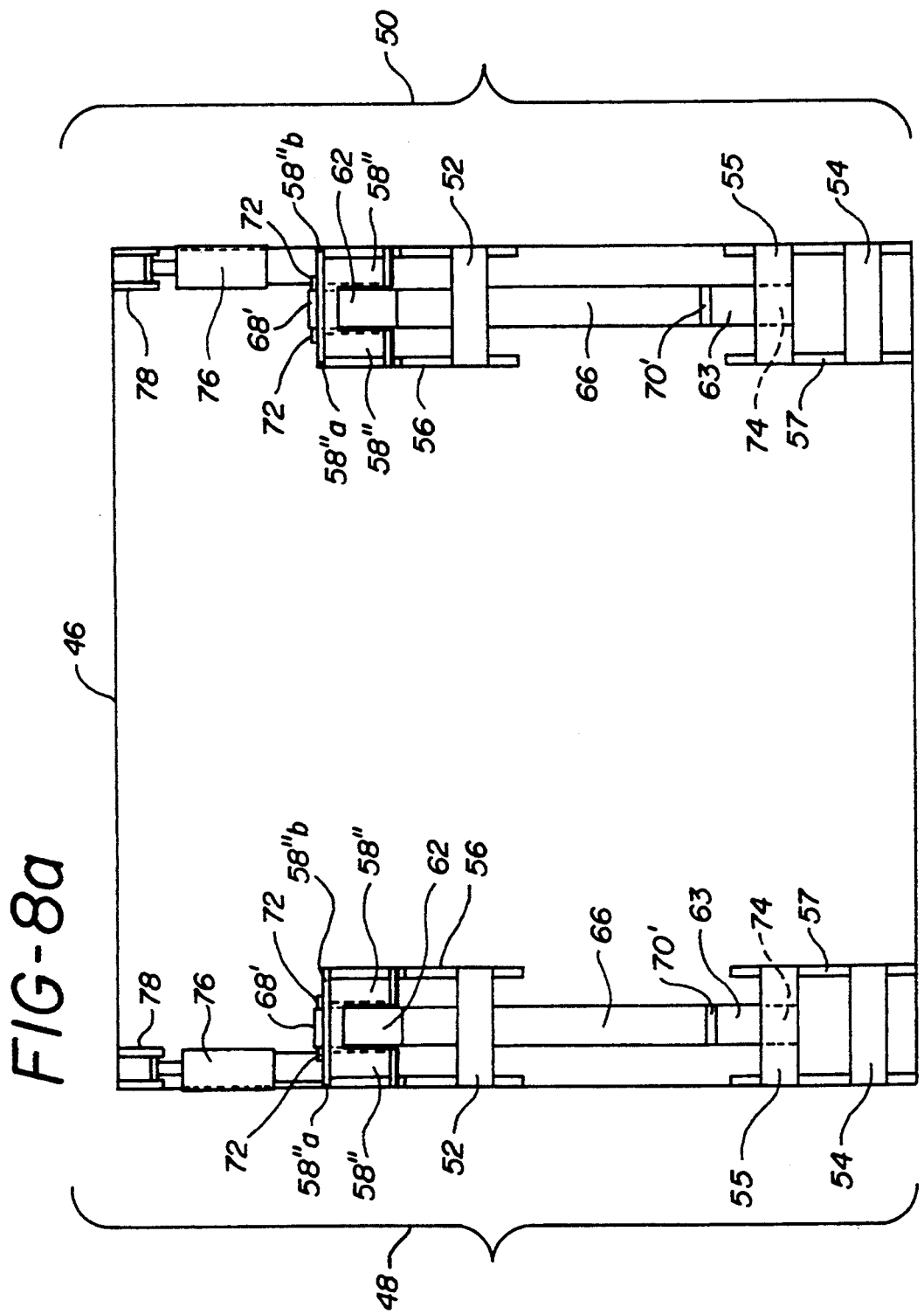

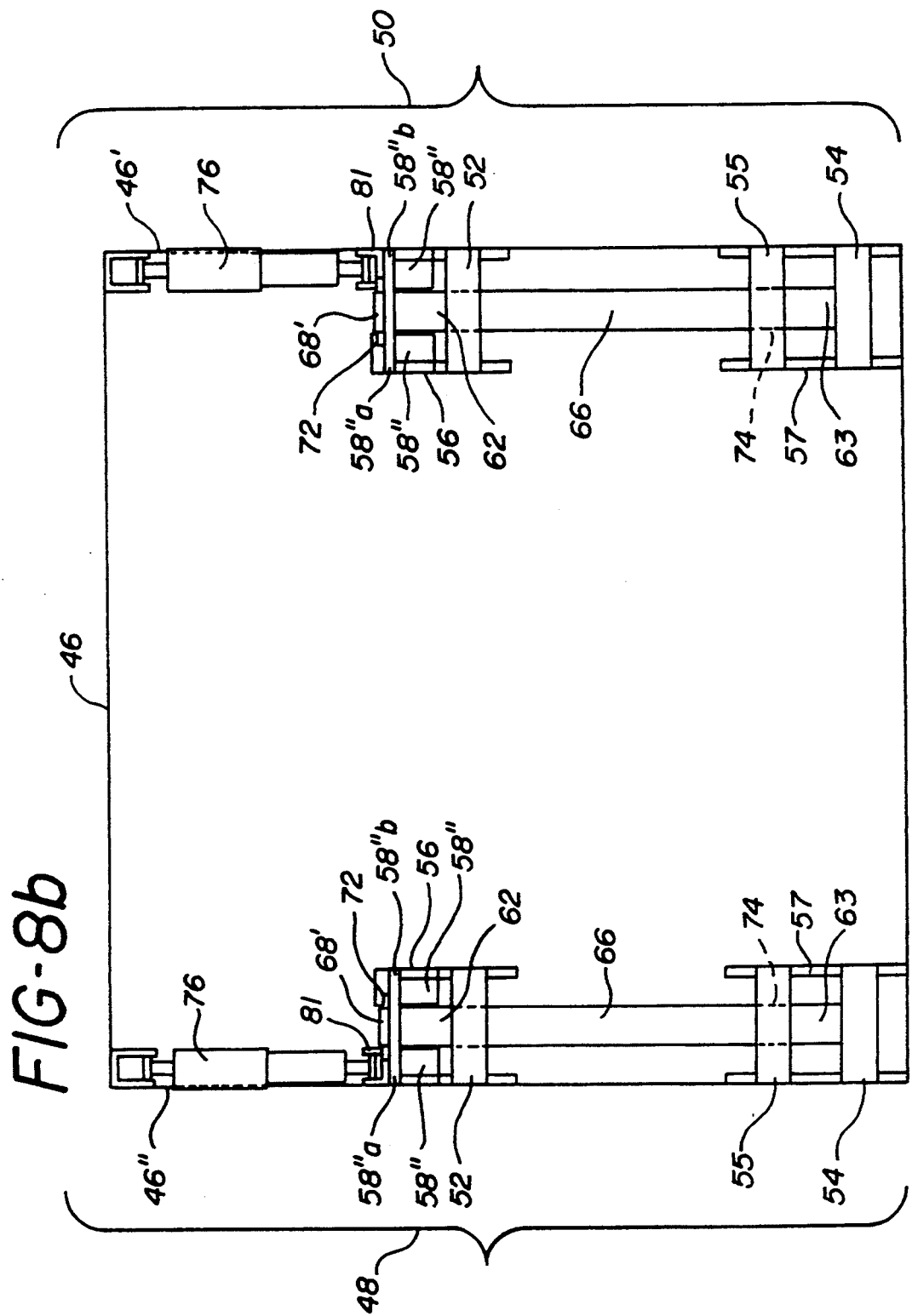

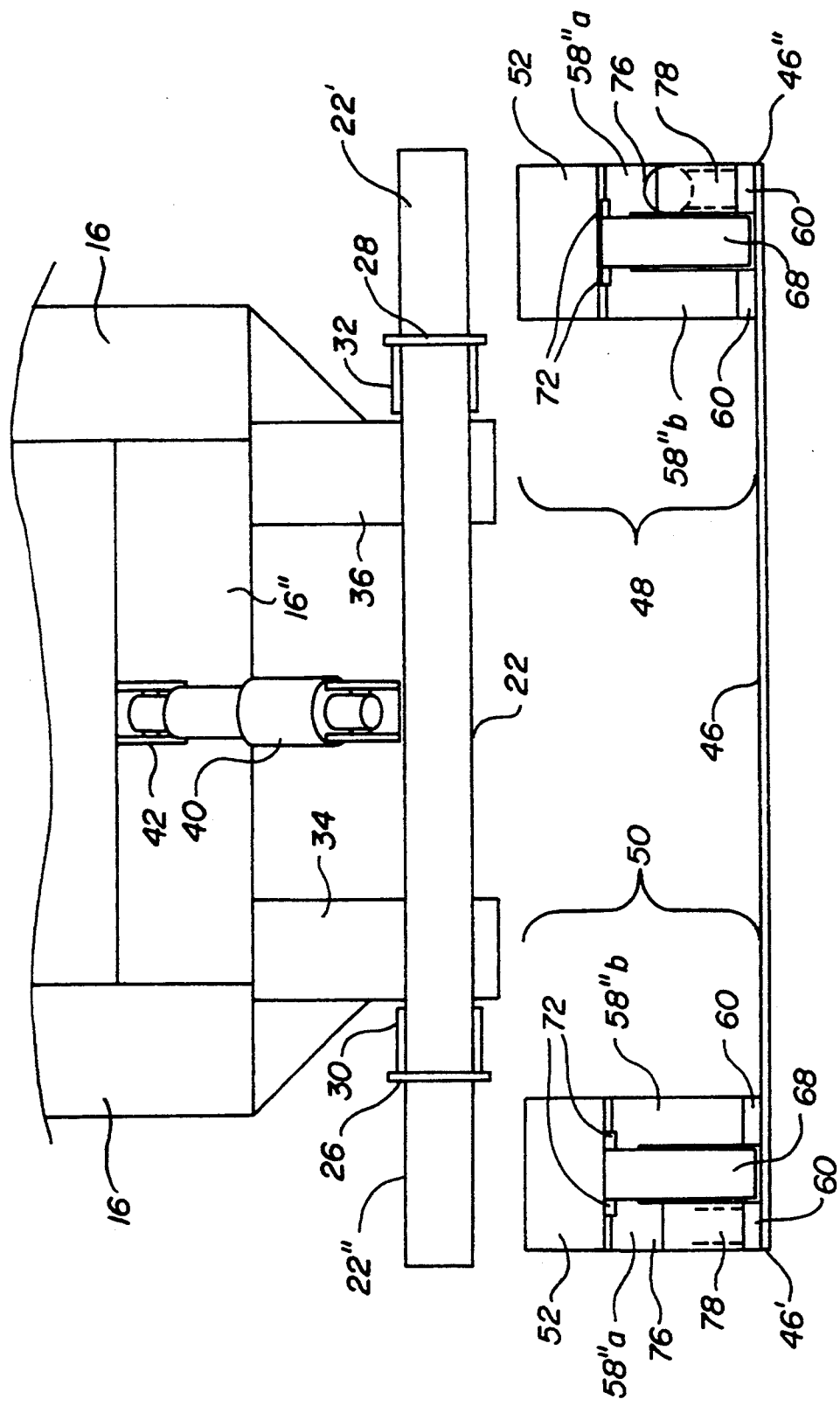

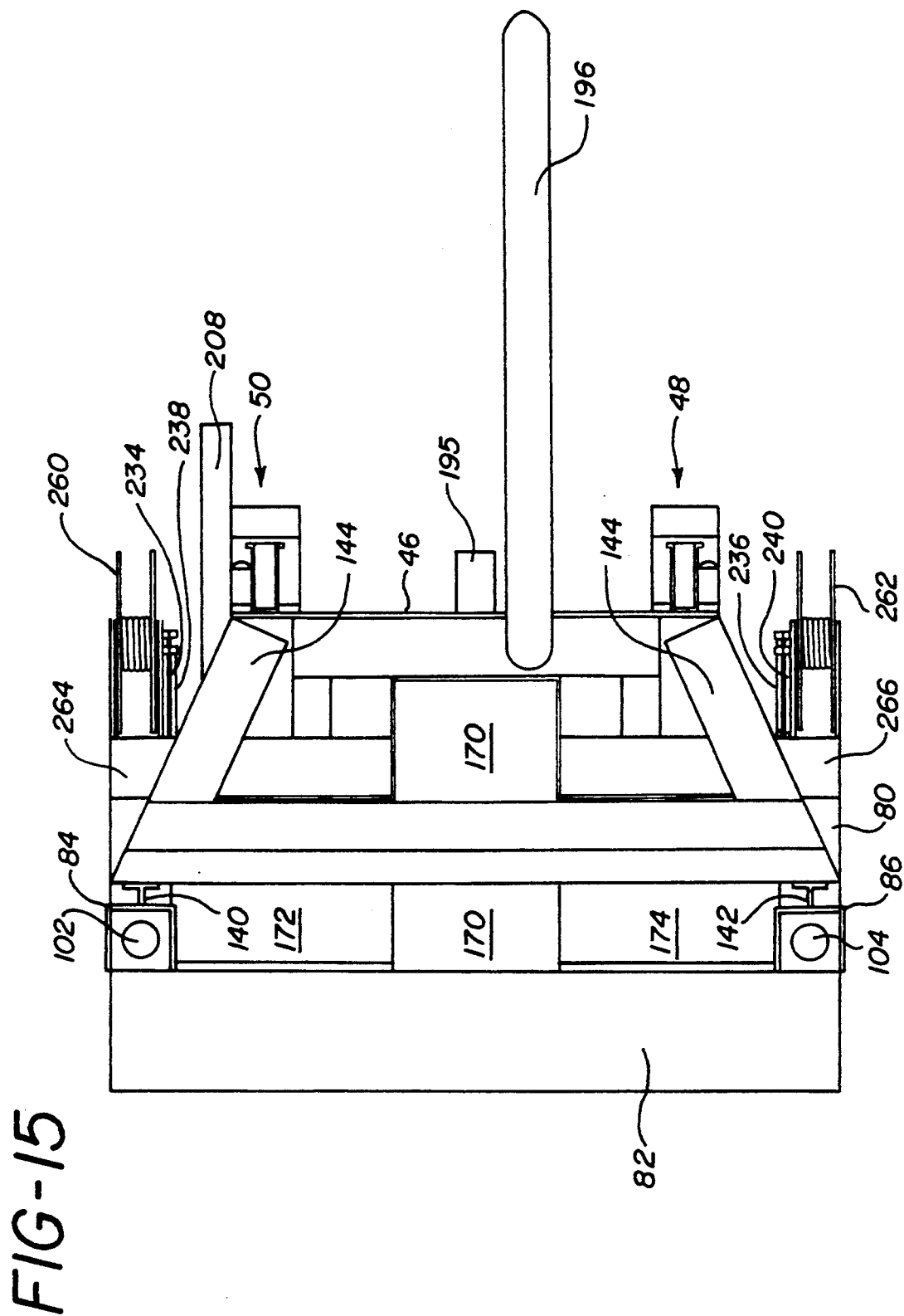

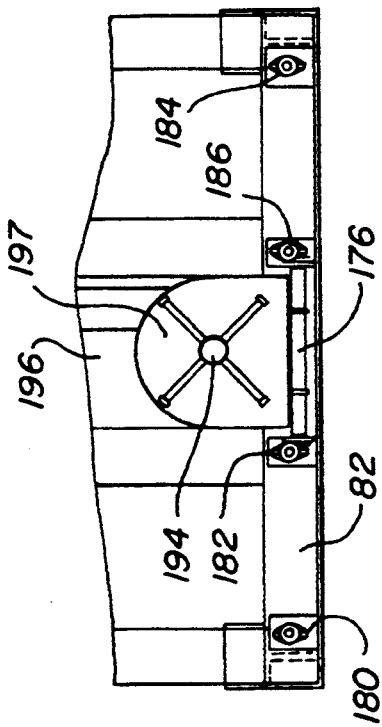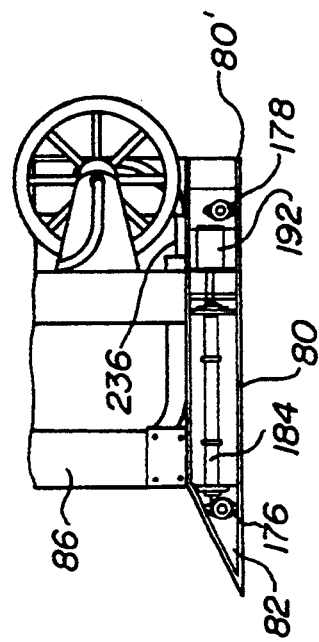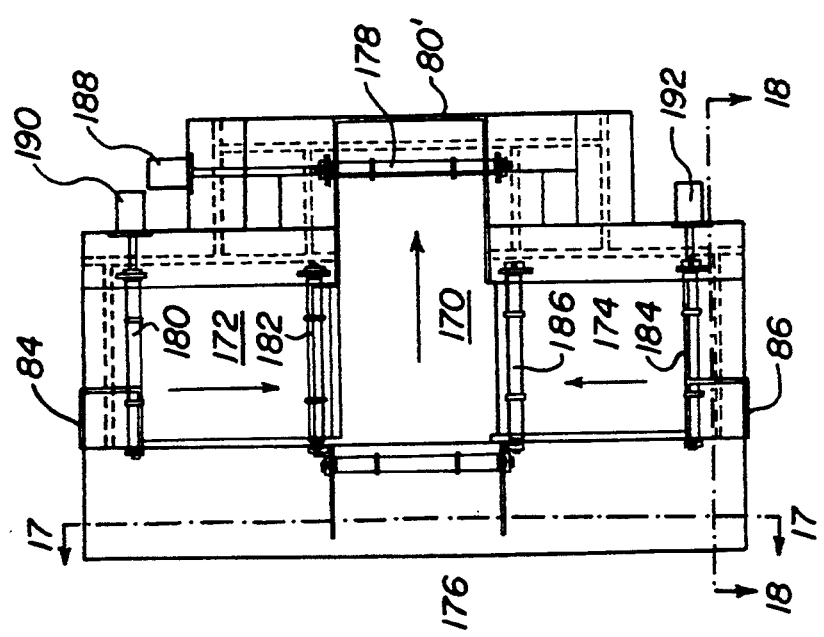

BUNK SILO UNLOADER

BACKGROUND OF THE INVENTION

This invention relates to agricultural material handling equipment and, more particularly, to a hydraulically operated bunk silo unloader which detachably connects to an agricultural vehicle having a flat bed trailer on which is carried a silage mixer box. The silo unloader mechanism detachably connects to the forward end of the vehicle and is operable via controls in the vehicle cab to comminute and transport silage from a stacked bunk silo bed into the silage mixer box.

Silage is typically deposited and allowed to cure outdoors in large horizontal bunk silos which can attain height, width and depth dimensions on the order of 10–15 feet or more. Bunk silos usually are confined on either side by a pair of vertical side walls and a back wall with the top and front thereof remaining open for the deposit and later retrieval of silage from the stack. As the stack is formed and allowed to cure, it becomes heavily packed and dense which presents handling difficulties at the time of gathering the silage from the stack. The silage must be removed from the stack and pulverized so that it may be mixed with other supplemental fodder for ultimate distribution to the animal feed stations.

Devices which comminute silage from horizontal silage stacks are known, some examples of which may be seen in the following U.S. patents:

U.S. Pat. No. 3,961,718 issued to Lucas on Jun. 8, 1976;
U.S. Pat. No. 4,157,164 issued to Helm et al on Jun. 5, 1979; and
U.S. Pat. No. 4,243,346 issued to Wolf on Jan. 6, 1981.

The Lucas device employs a vertically movable rotor 9 which discharges silage to a vertical conveyor 10 which deposits the silage into a trailer box 1.

The Helm et al device employs a vertically adjustable rotor 6 which dislodges and directs silage from a stack into a rotary beater 7 which breaks up large aggregations of forage and directs the same toward a conventional forage gathering device. The forage is then deposited on a housing 22 where it is urged toward a forage chopper 12 by an auger 23. The forage chopper 12 directs chopped forage to a blower 13 through a conveyor 14 to a trailing wagon 15 for later dispersal to livestock. The rotor head 6 is attached between a pair of arcuate-shaped booms which are hydraulically controlled by a pair of hydraulic rams 68.

Lastly, the Wolf device employs crank-operated rods which are angularly displaced of each other upon a pair of crankshafts for rotating movement thereon. The rods are generally vertically disposed and include longitudinally spaced work pieces thereon which are directed into the silage stack upon their respective downward strokes. Tines at the bottom of the rods push the silage detached by the work pieces backwards to a conveyor screw which delivers the silage to a blower unit for discharge to a feed trailer or the like.

SUMMARY OF THE INVENTION

It is a principal object of the present invention to provide an improved silo unloader operable to comminute and transfer silage from a stacked horizontal bunk silo to a feed trailer where the silo unloader is a detachable unit separable from an agricultural tractor.

It is another object of the present invention to provide a silo unloader of the above type in which all implement controls to drive and operate the agricultural vehicle and silo unloader are housed within the vehicle cab.

It is a further object of the present invention to provide a silo unloader of the above type which includes silage comminuting tools which are superior at cutting into and dislodging densely formed silage from a horizontal bunk silo.

Other objects will in part be obvious and in part appear hereinafter.

In accordance with the foregoing objects, the invention comprises a silo unloader which detachably connects to and is operable through an agricultural vehicle such as a tractor trailer combination where the flat bed trailer portion thereof carries a feed mixer bin thereon. The tractor is hydraulically driven and includes a mounting framework attached forwardly of the cab which detachably connects with portions of the silo unloader framework. The respective connecting portions of the tractor mounting framework and the silo unloader framework are aligned such that the tractor may be driven up to the silo unloader and attached thereto via hydraulic controls in the cab whereby the operator need not exit the cab to make the connections.

The silo unloader employs a comminuter of the rotating drum type having spiked teeth arranged in longitudinally extending, circumferentially spaced rows thereon. The drum is rotatably carried between a pair of hydraulic motors which themselves attach to a pair of respective motor mounts having integral nut elements which are threadedly engaged upon a pair of respective, vertically oriented jack screws. A pair of cutting wheels having rows of radially extending teeth are also provided at either end of the laterally extending drum and are rotatable therewith with the cutting wheels rotating about parallel axes which lie transversely to the axis of rotation of the drum. The cutting wheels are oriented to face in a frontal plane and cut directly into the silage stack front wall.

The hydraulic motors housed within the drum casing rotate the drum which in turn rotates the cutting wheels. A pair of synchronized hydraulic motors rotate the jack screws which cause vertical travel of the nut elements thereon in alternating downward and upward directions. Thus, the drum and cutting wheels rotate and travel in a reciprocating, vertical path simultaneously. The circular configuration of the cutting wheels on either side of the laterally extending drum permits a more efficient, deeper penetration into a bunk silo stack than was possible with silo unloaders of the prior art.

As the drum and cutting wheels comminute the silage from the stack, the loosened silage falls to the silo unloader platform which lies beneath and rearwardly of the drum and cutting wheels. The platform includes a series of endless belt conveyors which deliver the silage to a blower unit which discharges the silage through a chute, the opposite end of which is directed to discharge the silage into the mixer bin on the trailer.

BRIEF DESCRIPTION OF THE DRAWINGS

FIG. 4 is a partial, side, elevational view of the silo unloader mounting frame of FIG. 2 in spaced relation to the portion of the silo unloader which attached directly thereto;

FIG. 5 is the view of FIG. 3 showing the two portions attached together;

FIG. 6 is a perspective view of the paddle component of the silo unloader locking mechanism;

FIG. 7 is a perspective view of the locking frame component of the silo unloader locking mechanism;

FIGS. 8a and 8b are rear, elevational views of the portion of the silo unloader which attaches directly to the silo unloader mounting frame in the disengaged and engaged positions, respectively; FIGS. 9a and 9b are top plan views of FIGS. 4 and 5, respectively; FIG. 15 is a top plan view of the silo unloader with certain portions thereof not shown to improve clarity; FIG. 16 is a top plan view of the silo unloader platform; FIG. 17 is a partial, front, elevational view of the lower half of the silo unloader; FIG. 18 is a partial, side elevational view of FIG. 17 with portions of the platform broken away to reveal the conveyor belt rods and motors housed therein.

DETAILED DESCRIPTION

Figure 1:
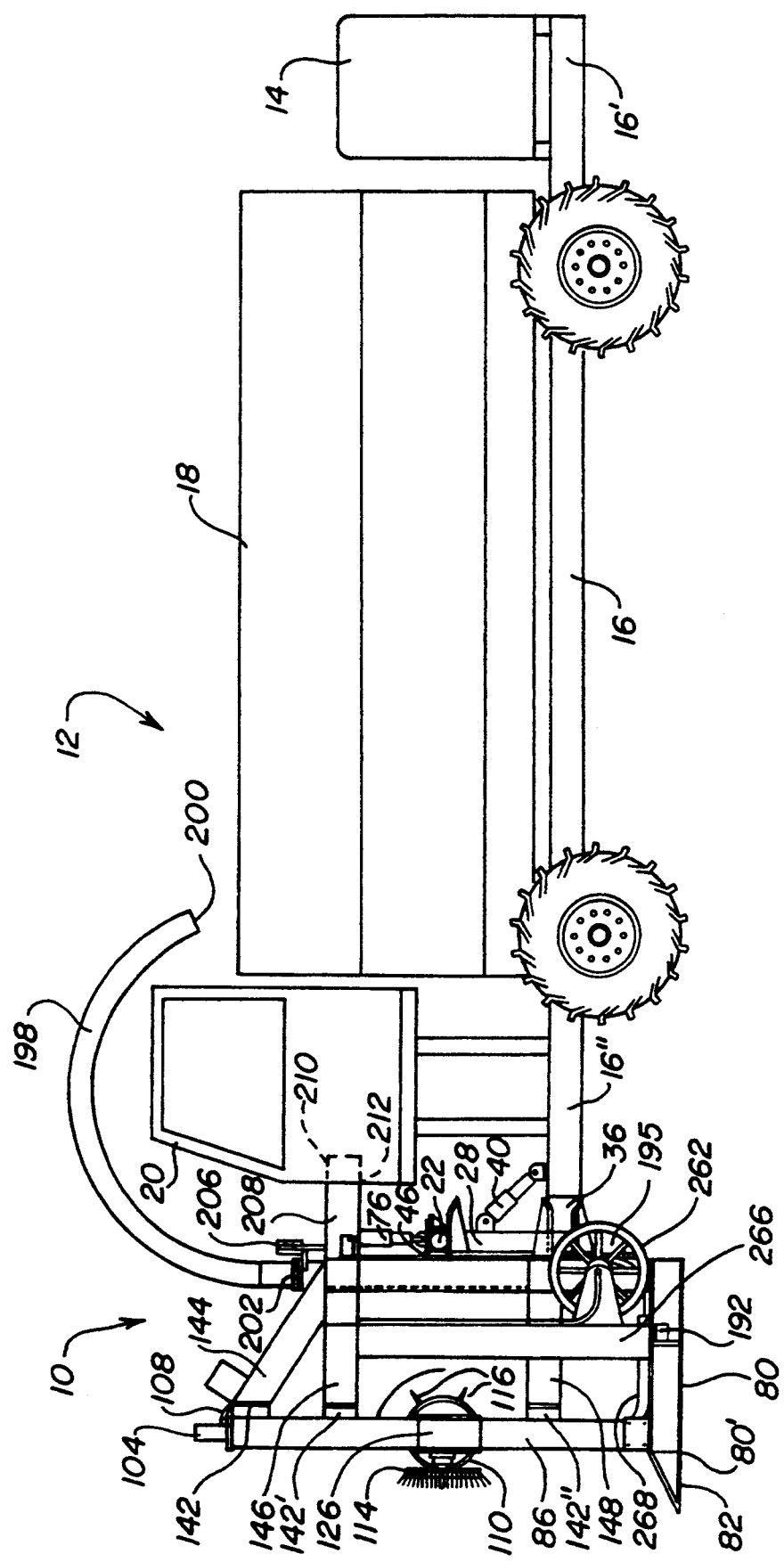
FIG. 1 is a side, elevational view of the silo unloader attached to an agricultural vehicle in the intended manner.
Figure 2:
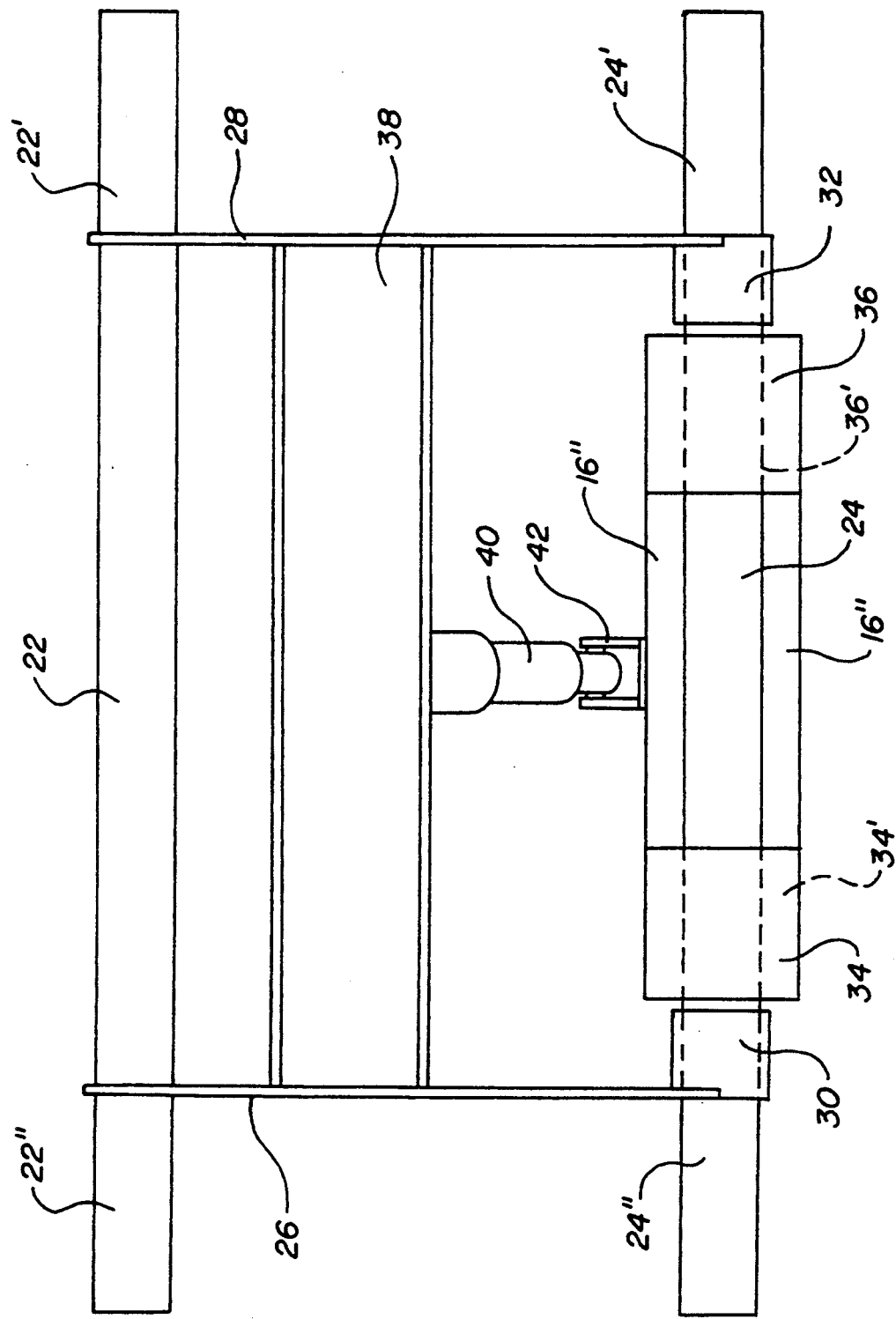
FIG. 2 is a front, elevational view of the silo unloader mounting frame which is seen attached to the forward end of the vehicle frame in FIG. 1.

Referring now to the drawings, there is seen in FIG. 1 a silo unloader 10 attached to the forward end of an agricultural vehicle 12. Vehicle 12 is hydraulically driven and includes a hydraulic engine compartment 14 mounted upon the rear portion 16' of the vehicle frame 16. A large auger/mixer bin 18 is provided and is removably seated upon frame 16 rearwardly of the operator's cab 20. Generally speaking, vehicle 12 is operable by a driver seated in cab 20 to carry and transport silage and other fodder deposited in bin 18 for delivery to the animal feeding areas. Silo unloader 10 detachably connects to vehicle 12 forwardly of cab 20 and is operable via controls inside cab 20 to comminute silage from an open air, horizontal bunk silo characterized by two vertical side walls between which silage is deposited and formed into a densely packed stack. Silo unloader 10 is further operable to direct the silage gathered from the silo stack through a chute 98 and into bin 18. After the desired amount of silage has been removed from the silo stack and deposited into bin 18 by silo unloader 12, silo unloader 12 may be easily and quickly detached from vehicle 12 which may then be driven to the feed site. Since all implement controls of both vehicle 10 and silo unloader 12 are housed within cab 20, the driver need not exit cab 20 to attach, operate or detach silo unloader 12 from vehicle 10.

Referring still to FIG. 1, and now also to FIGS. 2–5, a silo unloader mounting frame is permanently attached to the forward end 16" of vehicle frame 16 (e.g., by welding), and is seen to comprise upper and lower mounting arms 22 and 24, respectively, which are of cylindrical configuration and extend laterally across the front of vehicle 12 in vertically spaced, parallel relationship. Arms 22 and 24 are connected to one another by vertically extending, laterally spaced support members 26 and 28, respectively, with the opposite ends 22', 22" and 24', 24" of arms 22 and 24 extending laterally beyond either side of support members 26 and 28, respectively. Support members 26 and 28 include circular collars 30 and 32, respectively, at the lower ends thereof, and through which lower arm 24 extends. The front portion 16" of the vehicle frame 16 includes laterally spaced, forwardly extending beams 34 and 36 having laterally extending holes 34' and 36' formed therethrough, respectively, and through which lower arm 24 extends with collars 30 and 32 lying closely adjacent to the outer sides of beams 34 and 36, respectively, as seen best in FIG. 2.

Figure 3:
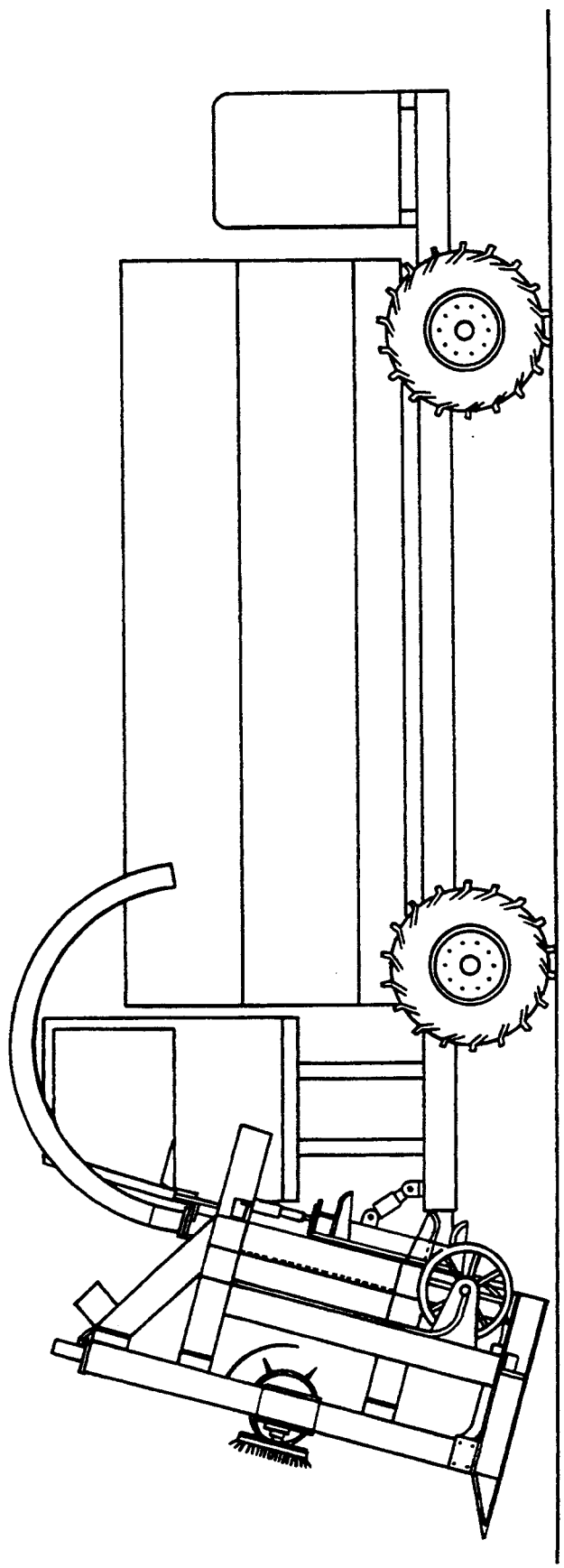
FIG. 3 is the view of FIG. 1 showing the silo unloader tilted rearwardly.
Figure 9B:
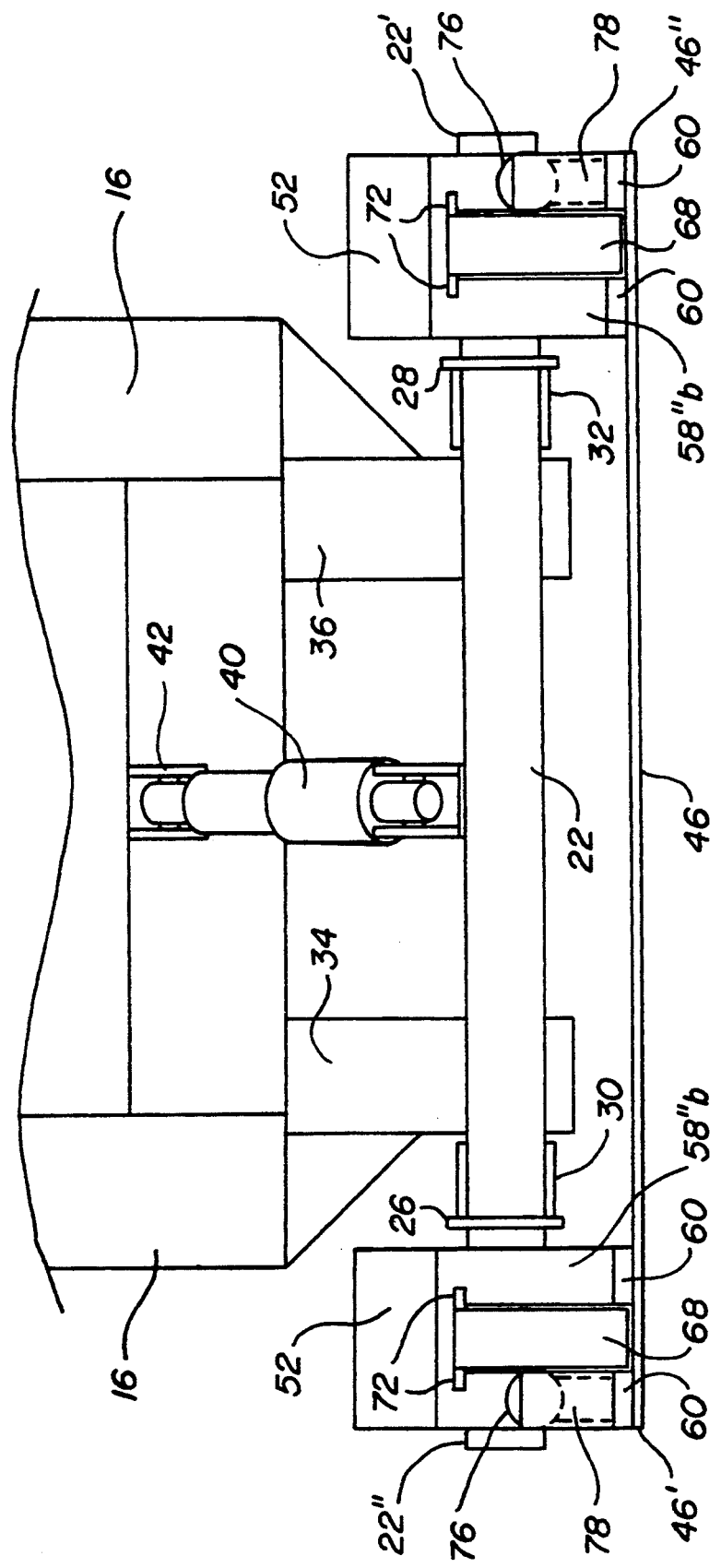
Figure 10:
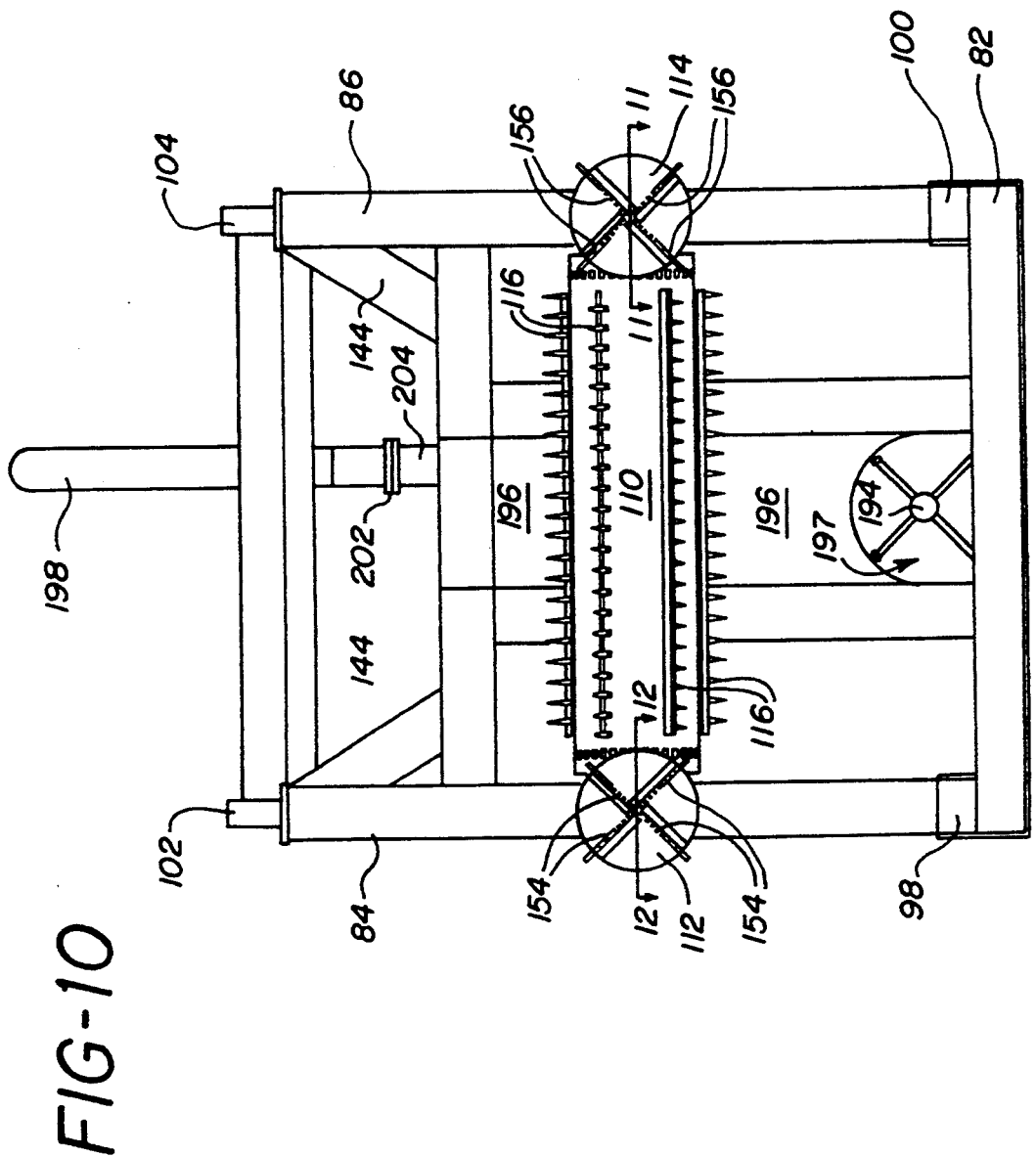
FIG. 10 is a front, elevational view of the silo unloader.
Figure 11:
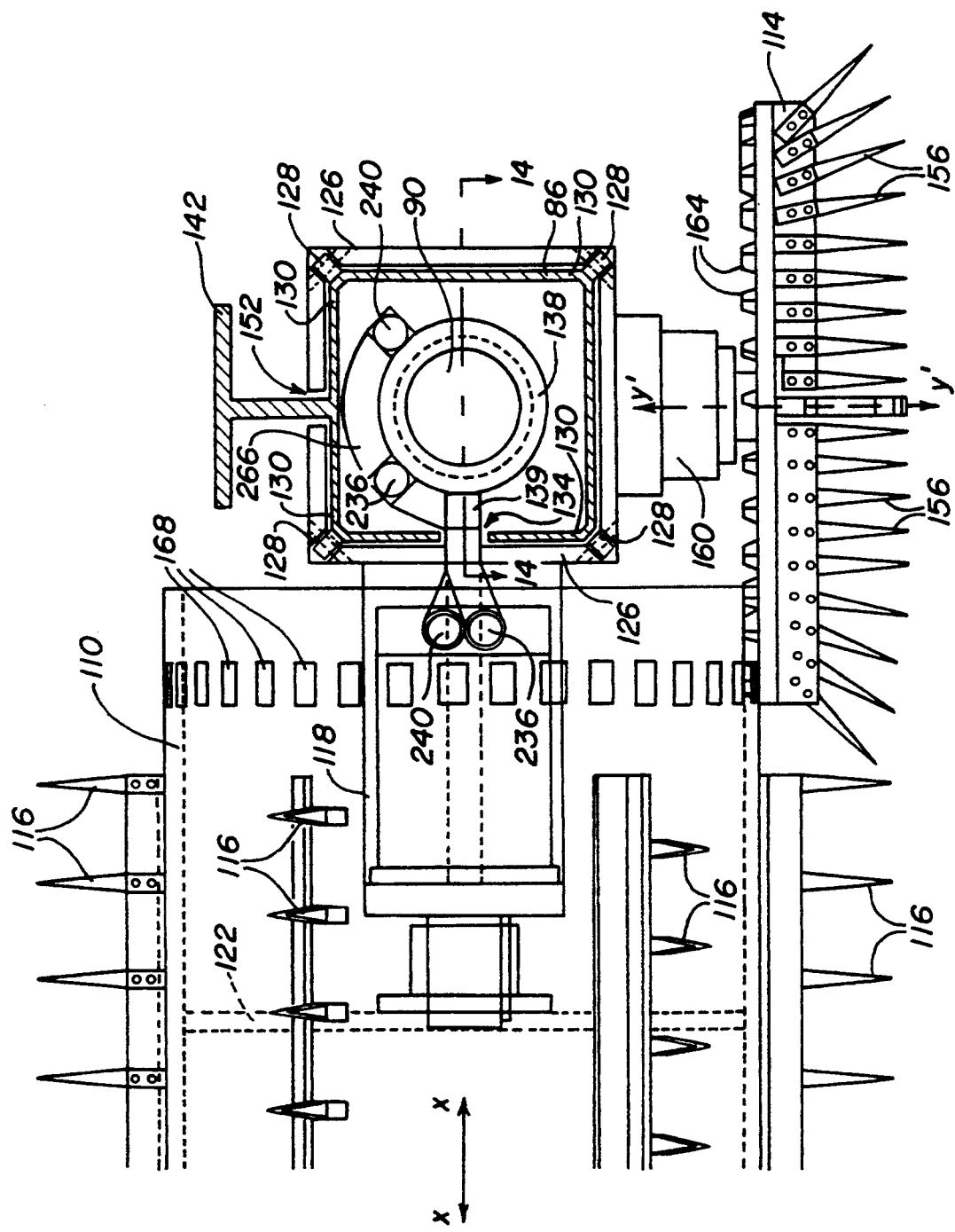
FIGS. 11 and 12 are fragmented, cross-sectional views of the right and left posts, drum and cutting wheels, respectively, as taken along the lines 11—11 and 12—12 in FIG. 10.
Figure 12:
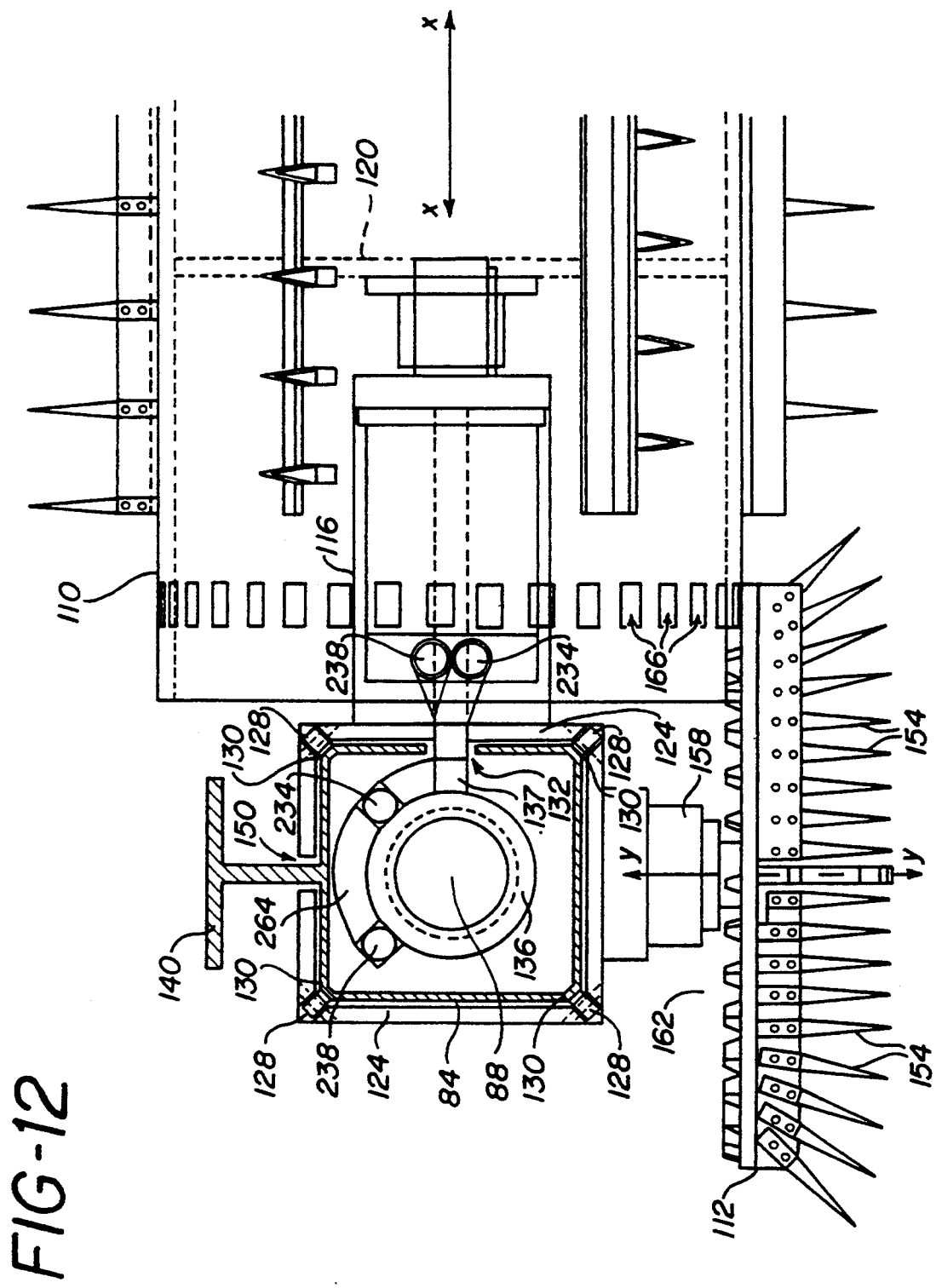

A brace 38 extends laterally between and interconnects support members 26 and 28 at a location between and parallel to arms 22 and 24 to provide reinforcement between members 26 and 28. A hydraulic ram 40 is attached at the piston and cylinder ends thereof to substantially the center of the forward vehicle frame portion 16" and the brace 38 via mounting brackets 42 and 44, respectively. Hydraulic ram 40 is operated via controls in cab 20 (to be described later) and may be moved between fully extended and fully retracted positions as seen in FIGS. 1 and 3, respectively, which in turn moves the silo unloader mounting frame described above, and thus the attached silo unloader 10, from the substantially upright position seen in FIG. 1 wherein the silo unloader 10 rests upon the ground, to the tilted position seen in FIG. 3 wherein the silo unloader 10 is lifted off the ground. In FIG. 3, the top portions of the silo unloader mounting frame and the silo unloader 10 are tilted approximately 15 degrees rearwardly toward vehicle 12 which lifts the silo unloader 10 off the ground so that it may be easily driven to another location if desired.

Attention is now turned to silo unloader 10 and, more specifically, to the portions thereof which permit connection to the silo unloader mounting frame of the vehicle 12 described above. As seen in FIGS. 4–9b, the portions of silo unloader 10 permitting attachment to the silo unloader mounting frame of vehicle 12 comprise a vertically oriented wall 46 to which are attached first and second silo unloader connecting apparatus indicated generally by reference numerals 48 and 50, respectively. Apparatus 48 and 50 traverse either side 46' and 46" of wall 46 and are of identical construction, therefore, the same reference numerals will refer to the same parts of both apparatus 48 and 50.

Specifically, apparatus 48 and 50 each include a single upper receiving bracket 52 and two lower, vertically spaced receiving brackets 54 and 55, respectively, with a semi-circular recess 56 and 57 disposed above brackets 52 and 54, respectively, and against which arms 22 and 24 are brought to bear in the fully engaged condition of silo unloader 10 to the silo unloader mounting apparatus of vehicle 12 as seen in FIG. 5.

The components which are operable to engage and lock the mounting frame to the silo unloader are as follows. A paddle 58 having a U-shaped planar member 58' and downwardly extending flange portions 58" is pivotally attached along the rear edges of planar member 58' by a pair of hinges 60 to rear wall 46 at a position above upper receiving bracket 52. Paddle 58 is further divided by a central slot 61 into two halves 58"a and 58"b (FIG. 6) to accommodate the upper locking blade 62 of the locking frame 64 seen best in FIG. 7. Specifically, locking frame 64 is of generally elongated, U-shaped outline having a rear wall 66 with top and bottom walls 68 and 70 extending perpendicularly therefrom, respectively. Also, an upper and lower locking blade 62 and 63 of generally rectangular outline extend perpendicularly downwardly from the top and bottom walls 68 and 70 thereof adjacent the forward edges 68' and 70' thereof, respectively. Locking frame 64 further includes a guide pin 72 which is slightly longer than and traverses the forward edge 68' of top wall 68. As seen in FIG. 8a, either end of guide pin 72 rests on top of paddle halves 58"a and 58"b which supports the locking frame 64 with the rear wall 66 thereof positioned against rear wall 46. Lower receiving bracket 55 also includes a central slot 74 wherethrough lower locking blade 63 may extend (FIGS. 8a and 8b).

Lastly, it is seen a hydraulic ram 76 is attached at the cylinder and piston ends thereof to the top corner of rear wall 46 and the upper surface of paddle half 58"a by brackets 78 and 81, respectively. Hydraulic ram 76 is movable via controls in cab 20 to and from the retracted position seen in FIGS. 4 and 8a, and the extended position seen in FIGS. 5 and 8b. In the retracted position, paddle 58 is pivoted and lifted upwardly about hinges 60 whereby flange portions 58" lie at a position above and clear of semi-circular recess 56. Furthermore, as paddle 58 is lifted, it bears against guide pin 72 which lifts upper wall 68 and thus the entire locking frame 64 therewith. In this lifted position, the bottom edges of upper locking blade 62 and upper paddle flanges 58" are substantially aligned, and the bottom edge of lower locking blade 63 is at a position above and clear of semi-circular recess 57. With both the upper and lower recesses 56 and 57 clear, mounting arms 22 and 24 may be brought to bear thereagainst, respectively, by driving vehicle 10 to silo unloader 12 with these components in alignment as shown in FIG. 4.

When arms 22 and 24 are in position against recesses 56 and 57 as described above, ram 76 is moved to the fully extended position which forces paddle 58 downwardly. Since locking frame 66 is supported by paddle 58, it also descends with paddle 58. In the fully descended positions of paddle 58 and locking frame 66 as seen in FIGS. 5 and 8b, the upper mounting arm 22 is surrounded on each side thereof by upper receiving bracket 52, recess 56, paddle 58, and upper locking blade 62. Also, the lower mounting arm 24 is surrounded on each side thereof by lower receiving brackets 54 and 55, recess 57, and lower locking blade 63. As such, the silo unloader 10 is securely attached to the vehicle 12 and may be moved therewith. Release of silo unloader 10 from the silo unloader mounting frame on vehicle 12 simply involves moving ram 76 back to the retracted position and backing the vehicle 12 away from silo unloader 10.

Attention is now turned to the remaining features of silo unloader 10. As seen in the side and front elevational views of FIGS. 1 and 8, respectively, silo unloader 10 includes a generally rectangular platform 80 having a wedge-shaped ramp portion 82 traversing the forward edge 80' thereof. Ramp portion 82 is provided so that as silo unloader 10 is driven against the silage stack, ramp portion 82 will penetrate the area between the bottom of the silage stack and the silo floor. This ensures the comminuting components of silo unloader 10 will act on a maximum possible height of the silage stack in the manner described below.

A pair of screw posts 84 and 86 are attached in vertically upright, laterally spaced positions upon platform 80 adjacent the two front corners thereof. Screw posts 84 and 86 are hollow and house a respective pair of elongated, rotatable screw jacks 88 and 90 having externally threaded surfaces as seen in FIGS. 9-12. The bottom ends of screw jacks 88 and 90 each include a journal 92, 93 which is rotatably received within a respective journal bearing 94, 96 which themselves are centrally positioned within a respective lower post mounting frame 98 and 100 which anchor posts 84 and 86 to platform 80, respectively. A pair of screw motors 102, 104 are connected to the top ends of screw jacks 88, 90 externally of posts 84, 86, respectively, and are hydraulically operable via hydraulic lines (only one hydraulic line 108 connected to motor 104 is seen in FIG. 1) which lead from cab 20 to rotate screw jacks 88 and 90 in either clockwise or counter-clockwise directions.

Referring to FIGS. m and 10-12, the comminuting elements of silo unloader 10 are seen to comprise a cylindrical drum 110 and first and second cutting wheels 112 and 114. The outer surface of drum 110 includes a plurality of spiked teeth 116 extending outwardly therefrom and arranged in circumferentially spaced, longitudinally extending rows thereon. Drum 110 is rotatably carried and extends between screw posts 84 and 86 whereby drum 110 may rotate about its central, longitudinal axis x—x while simultaneously traveling in both upward and downward directions along substantially the full lengths of screw posts 84 and 86.

More specifically, a pair of hydraulic drum motors 116 and 118 are mounted to respective drum mount plates 120 and 122 fixedly secured within drum 110 adjacent either end thereof. The portions of the casings of motors 117 and 118 located opposite plates 120 and 122 extend outwardly of their respective ends of drum 110 and secure to respective motor mounts 124 and 126 which themselves are slidingly attached in surrounding, slightly spaced relationship to screw posts 84 and 86, respectively. In this regard, motor mounts 124 and 126 are seen to be of generally square configuration and include a wheel 128 rotatably mounted at a 45° angle to the inside of each of the four corners thereof, which wheels are positioned in sliding engagement with the respective beveled corners 130 formed along the outer surfaces of screw posts 84 and 86.

Screw posts 84 and 86, which are also of generally square configuration, further include a respective slot 132 and 134 which longitudinally extend the full lengths thereof on the sides thereof facing drum 110. Nut elements 136 and 138 are threadedly engaged to screw jacks 88 and 90, respectively, with a connecting piece 137 and 139 interconnecting nut elements 136, 138 and motor mounts 124, 126 together through slots 132, 134 of screw posts 84, 86, respectively. As such, as screw jacks 88 and 90 rotate via motors 102 and 104, nut elements 136 and 138, and hence motor mounts 124 and 126, ride vertically along screw posts 84 and 86, respectively.

Screw posts 84 and 86 are seen to each further include 3 integral T-shaped members 140, 140', 140" and 142, 142', 142" extending from the rear sides thereof located opposite cutting wheels 112 and 114 for securing posts 84 and 86 to the frame bracing members 144, 146 and 148 seen in FIG. 1 (the set of bracing members corresponding to 144,146 and 148 and connecting to member 140 not seen in FIG. 1). In this regard, motor mounts 124 and 126 also include a respective slot 150 and 152 which longitudinally extend the full lengths thereof on the sides thereof located opposite cutting wheels 112 and 114 whereby motor mounts 124 and 126 may pass over T-shaped members 140 and 142 when traveling along screw posts 84 and 86, respectively.

Cutting wheels 112 and 114 are seen to be of circular configuration with each including a plurality of spiked teeth 154 and 156 extending outwardly from the forward facing surfaces thereof in equally spaced, radially extending rows thereon, respectively. Wheels 112 and 114 are rotatably mounted to the forward facing sides of motor mounts 124 and 126 (opposite slots 150 and 152) via bearings 158 and 160, respectively. Cutting wheels 112 and 114 are further rotatably connected to either end of drum 110 whereby rotation of drum 10 about its longitudinal axis x—x via motors 116 and 118 cause wheels 112 and 114 to rotate about their respective axes y—y and y'—y' which lie parallel to each other and perpendicular to axis x—x. This rotatable connection between drum 110 and wheels 112 and 114 is achieved by a plurality of annularly spaced bosses 162 and 164 on the surfaces of wheels 112 and 114 located opposite teeth 154 and 156 and positioned to removably engage a plurality of circumferentially spaced apertures 166 and 168 formed adjacent either end of drum 110, respectively. Thus, rotation of drum 110 about axis x—x causes rotation of wheels 112 and 114 about axes y—y and y'—y' by virtue of apertures 166 and 164 successively pulling and pushing bosses 162 and 164 into and out of meshing engagement therewith, respectively.

As drum 110 and cutting wheels 112 and 114 cut into the silage stack, loose silage is tossed rearwardly of drum 110 towards vehicle 12 and drops to platform 80. Referring to FIGS. 13-16, platform 80 is seen to be equipped with one central and two side conveyor belts 170, 172 and 174, respectively, with central belt 170 trained about forward and rear conveyor rods 176 and 178 which are mounted in spaced, parallel relationship to each other with rod 176 positioned inside ramp portion 82 and rod 178 positioned adjacent and parallel to rear edge 80' of platform 80. Likewise, side belts 172 and 174 are each trained over a respective pair of conveyor rods 180, 182 and 184, 186 which lie in spaced and parallel relationship to each other on either side of conveyor 170 as seen best in FIG. 14. One of each pair of conveyor rods 178, 180 and 184 are attached to and driven by a hydraulic motor 188, 190 and 192 respectively, and are operable to turn belts 170, 172 and 174 about their respective rods in the directions indicated by the arrows in FIG. 14. (Rods 176, 182 and 186 are idlers and not directly powered). As such, loose silage falling onto side belts 172 and 174 is directed onto center belt 170 which, in turn, directs the silage rearwardly to a multi-vaned blower 194 having a motor 195. Blower 194 is housed within a box-like enclosure 196 having an opening 197, blower 194 directing and discharging the silage upwardly through enclosure 196 and into a chute 198 which deposits the loose silage through open end 200 thereof into bin 18.

As seen best in FIGS. 1 and 8, the end of chute 198 opposite end 200 is rotatably connected by a swivel connection 202 to a hollow attachment piece 204 which interconnects enclosure 196 and chute 198. Chute 198 is provided with a hydraulic motor 206 operable to rotate chute 198 about swivel connection 202 if desired. For example, an auxiliary bin (not shown) may be positioned to the side of vehicle 12 in which case chute 198 is rotated to position open end 200 thereof over the auxiliary bin.

Attention is now turned to the connections and operation of each of the hydraulically driven elements of the invention which have been mentioned above. As seen in FIG. 1, silo unloader 10 includes a hollow hydraulic lines arm 208 which houses and directs all hydraulic lines from the vehicle cab 20 to the hydraulic components of silo unloader 10. Specifically, as vehicle 12 is driven up to and connected to silo unloader 10 in the manner described above, the rear-most end 210 of arm 208 is aligned to be received through an opening 212 formed in the front wall 214 of the vehicle cab 20 (FIGS. 1 and 18). In FIG. 18, cab 20 is seen to house all hydraulic controls to operate silo unloader 10; namely: 1) the silo unloader mount locking ram (76) control; 2) the silo unloader mount ram (40) control 217; 3) the blower motor (195) control 218; 4) the motors for each conveyor belt (188, 190 and 192) control 219; 5) the drum motors (116, 118) control 220; and 6) the jack screw motors (102, 104) controls 222(*a* and *b*).

All hydraulic hose connections are made inside cab 20 through a panel opening 223 located directly above the point where arm 208 enters opening 212. Specifically, the ends 224 of the hydraulic lines of the silo unloader hydraulic components (to be described below) extend from arm end 210 and may be easily and quickly connected to and disconnected from, via connectors 225, respective ends 226 of the hydraulic lines located inside opening 223 which lead to the controls 216-222 in cab 20.

Figure 19B:
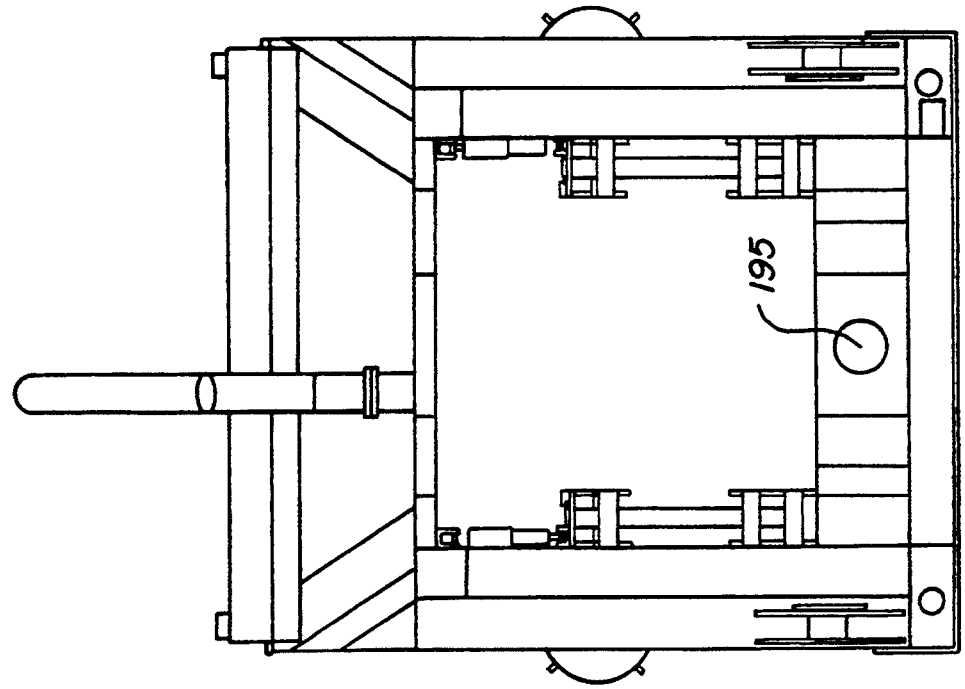
FIGS. 19a and 19b are rear, elevational views of the silo unloader and silo unloader mounting frame in the disengaged and engaged conditions, respectively.
Figure 19A:
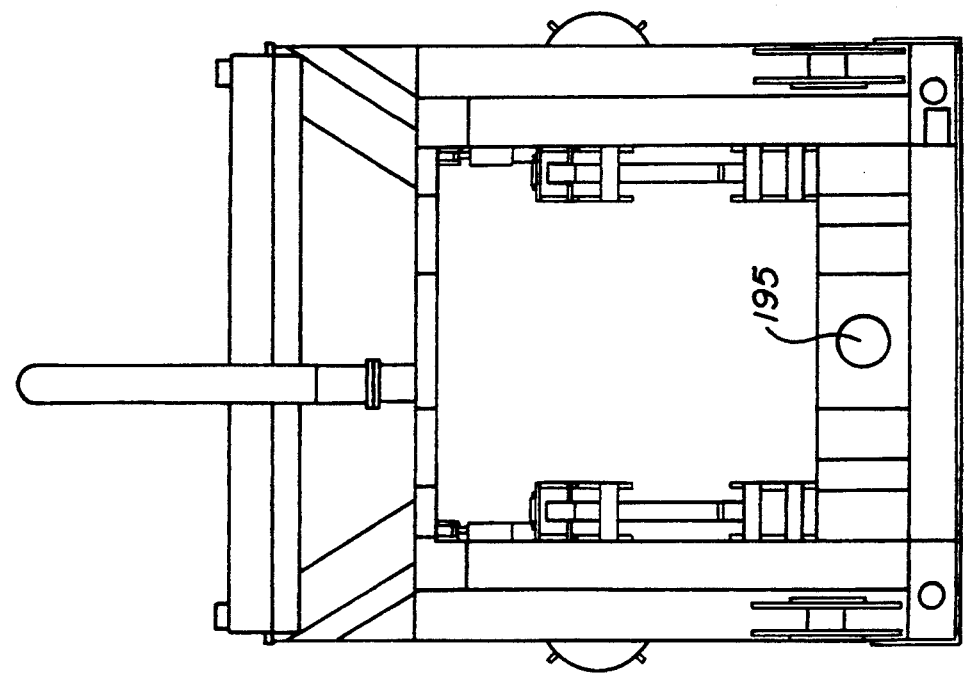
Figure 20:
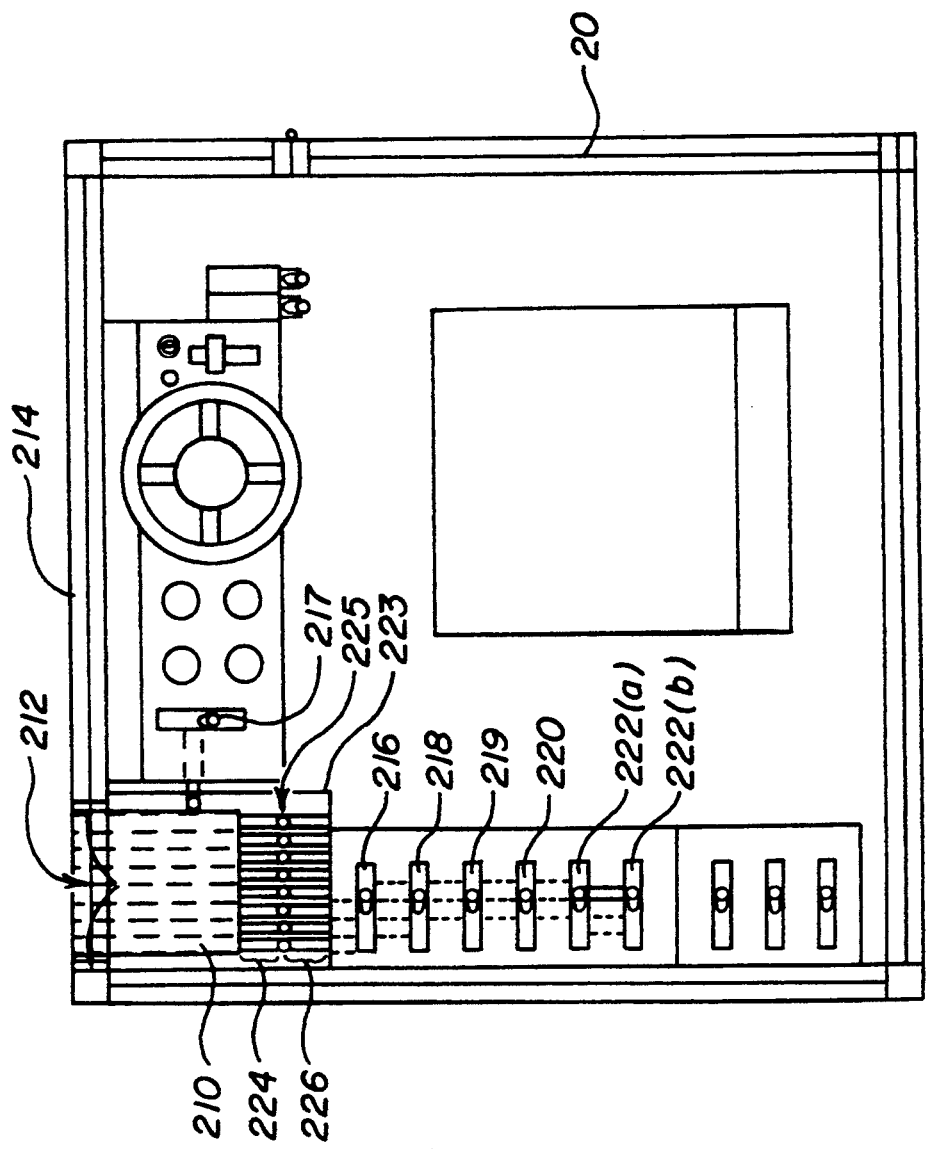
FIG. 20 is a simplified, top plan view of the interior of the vehicle cab.
Figure 21:
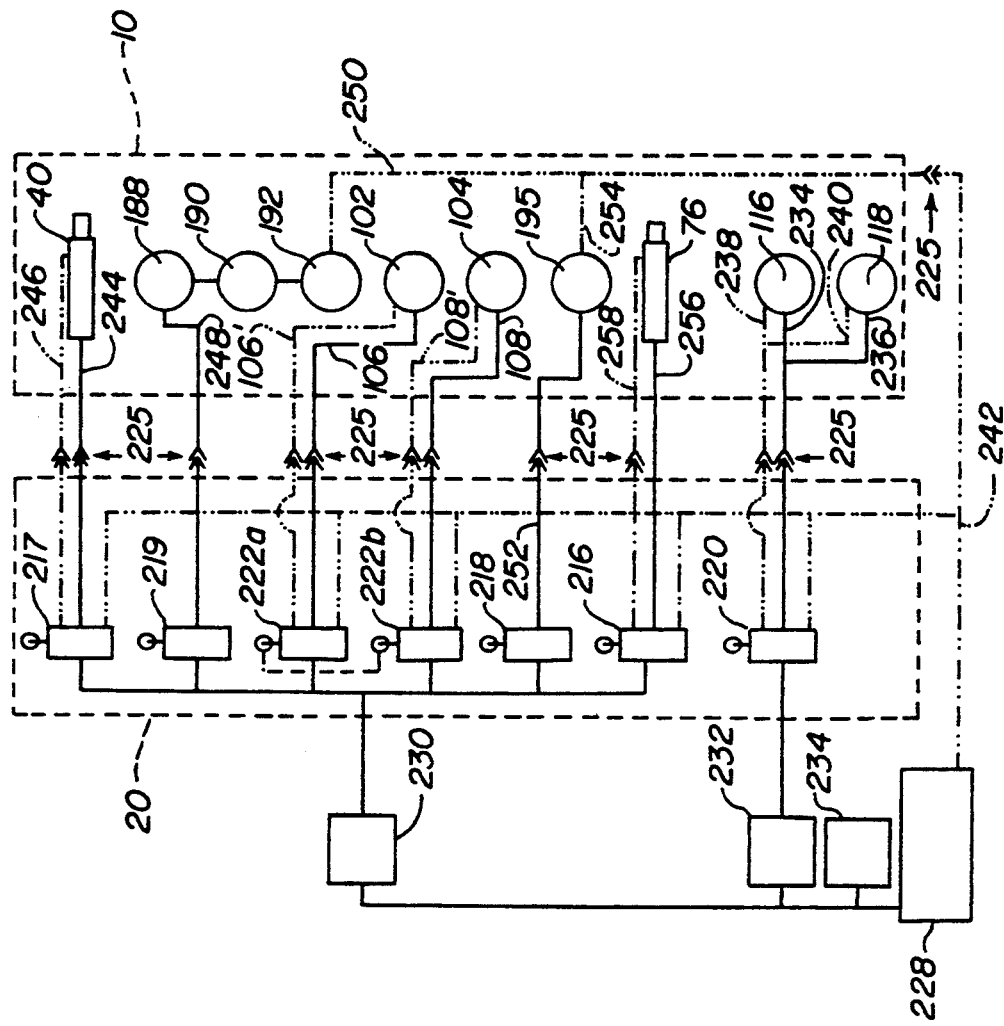
FIG. 21 is a block-type flow diagram of the hydraulic operating system between the vehicle cab and the silo unloader.

A diagrammatic flow chart of the hydraulic system of the invention is seen in FIG. 19 wherein a hydraulic fluid reservoir 228 delivers hydraulic fluid to pumps 230 and 232 which are housed within engine compartment 14 (FIG. 1). Pump 232 pumps hydraulic fluid to drum motor control 220 which connects to drum motors 116 and 118 via hydraulic lines 234 and 236, respectively (see also FIGS. 8 and 9). Return lines 238 and 240 deliver hydraulic fluid from motors 116 and 118, respectively, back to control 220 and ultimately to reservoir 228 through the master return line 242.

Pump 230 delivers hydraulic fluid to the remaining controls described above. More particularly, control 217 connects to the silo unloader hydraulic ram 40 through deliver and return lines 244 and 246, respectively; control 219 connects to belt motors 188, 190 and 192 via common delivery and return lines 248 and 250, respectively; control 222(*a*) connects to screw motor 102 through deliver and return lines 106 and 106', respectively; control 222(*b*) connects to screw motor 104 through deliver and return lines 108 and 108', respectively; control 218 connects to blower motor 195 through deliver and return lines 252 and 254, respectively; and control 216 connects to the silo unloader mount locking ram (76) through deliver and return lines 256 and 258, respectively.

Figure 13:
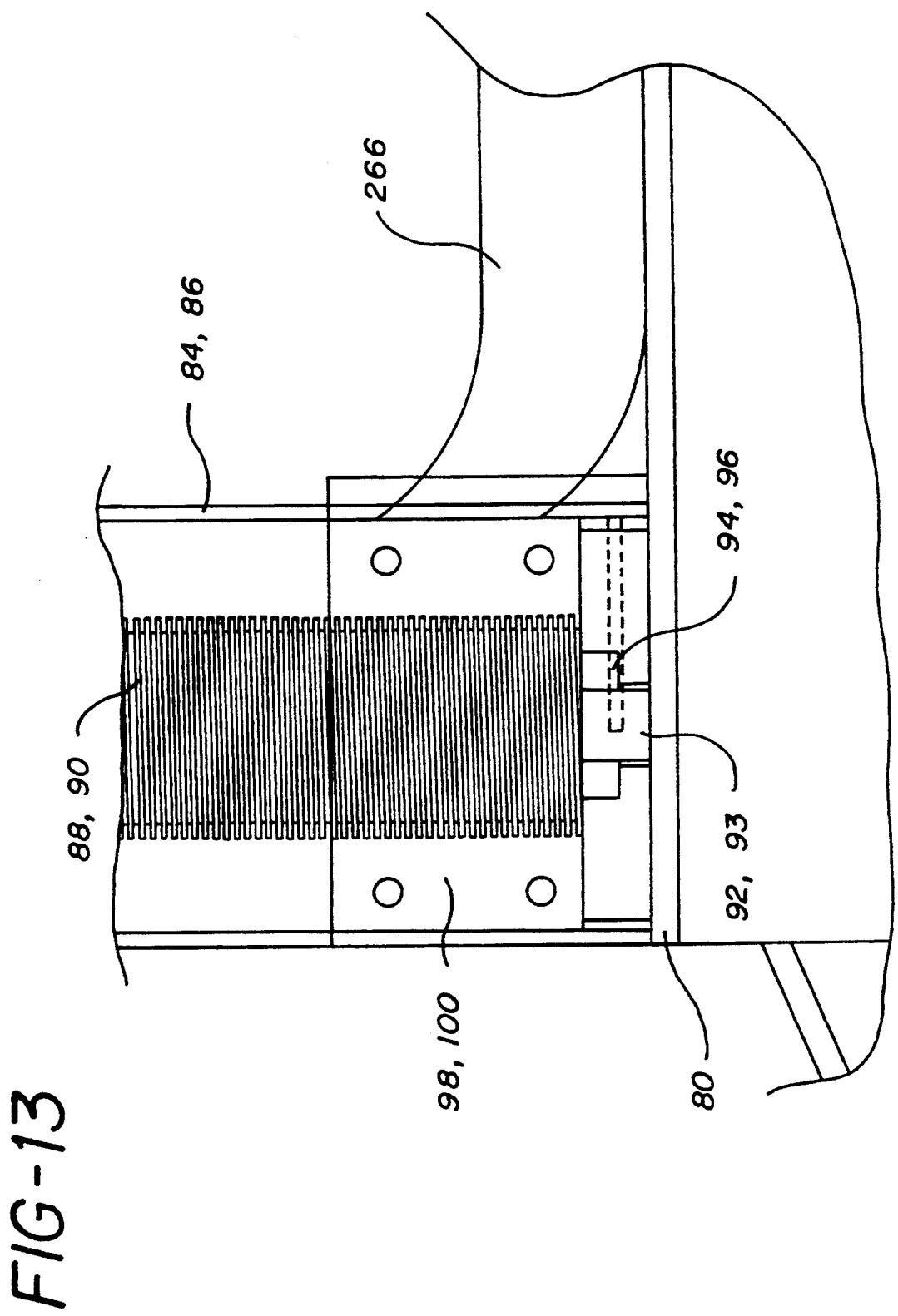
FIG. 13 is a fragmented, cross-sectional view of the lower post assembly seen in FIG. 18.
Figure 14:
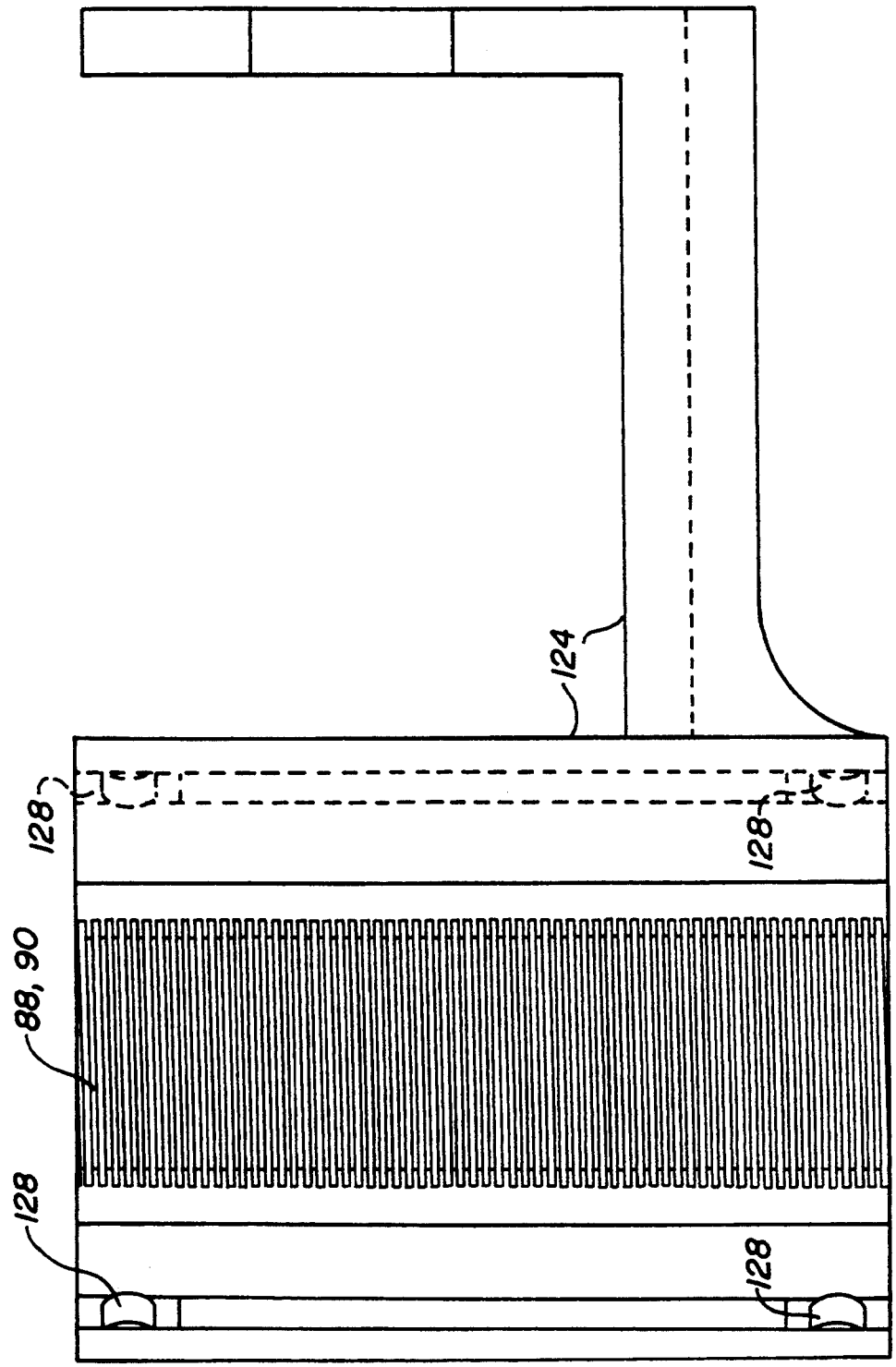
FIG. 14 is an enlarged, cross-sectional view of the motor mount and jack screw as taken along the line 14—14 in FIG. 11.

As seen in FIGS. 9, 13 and 16, the delivery and return lines 234, 238 and 236, 240 connecting to drum motors 116 and 118, respectively, are wound upon take-up reels 260 and 262 which are mounted to upstanding frame braces 264 and 266 which themselves mount to platform 80 rearwardly of posts 84 and 86, respectively. Reels 260 and 262 are spring-loaded and biased in a single rotational direction such that they are operable to take up the slack in lines 234,238 and 236, 240 as drum 110 travels vertically down between posts 84 and 86. The biasing force is not, however, greater than the force at which drum 110 is caused to vertically travel between posts 84 and 86 by screw motors 102 and 104 so that the hydraulic lines are easily reeled from reels 260 and 262 by drum 110 as it travels in the upward direction. Also, as seen in FIGS. 1, 9, 10 and 11, lines 234, 238 and 236, 240 are directed from reels 260 and 262, through respective hydraulic casings 264 and 266 which extend interiorly of posts 84 and 86 to motor mounts 124 and 126.

What is claimed is:

1. A silo unloader for comminuting and collecting silage from a silage stack, said silo unloader being detachably connectable to and operable through a driven vehicle having an operator's cab, said silo unloader comprising:
   a) first and second, vertically oriented screw jacks including means selectively and simultaneously rotating both of said first and second screw jacks in synchronous and alternate clockwise and counter-clockwise directions;
   b) a cylindrical drum having a plurality of spiked teeth extending therefrom including means selectively rotating said drum about its longitudinal axis, said drum being rotatably carried and extending perpendicularly between said first and second screw jacks;
   c) first and second nut elements threadedly engaged to said first and second screw jacks, respectively, with either end of said drum being connected to said first and second nut elements, respectively, whereby rotation of said first and second screw jacks in said clockwise and counter-clockwise directions causes said first and second nut elements to travel thereon in traversing, upward and downward directions, respectively, with said drum thereby also traveling in upward and downward directions with said first and second nut elements and between said first and second screw jacks;
   d) first and second cutting wheels each having a plurality of spiked teeth extending from first surfaces of each, said first and second cutting wheels being rotatably connected to and movable with said first and second nut elements adjacent either end of said drum, respectively, and rotatable about parallel axes which lie transversely to said drum longitudinal axis; and
   e) means automatically rotating said first and second cutting wheels about said parallel axes in response to said rotation of said drum about said longitudinal axis.

2. The invention according to claim 1 wherein said means automatically rotating said first and second cutting wheels about said parallel axes comprises:
   a) a plurality of annularly spaced bosses extending from a second surface of each of said first and second cutting wheels located opposite said first surfaces thereof; and
   b) a plurality of apertures formed in circumferentially spaced relation adjacent each end of said drum with said plurality of bosses on said first and second cutting wheels being positioned in meshing engagement with said plurality of apertures in each end of said drum, respectively.

3. The invention according to claim 1 wherein said apparatus further comprises:
   a) first and second hollow posts wherein said first and second screw jacks are positioned, respectively; and
   b) first and second motor mounts attached in sliding and surrounding relation to said first and second posts, said first and second motor mounts attached to and movable with said drum and said first and second nut elements, respectively.

4. The invention according to claim 3 wherein said first and second cutting wheels are rotatably attached to said first and second motor mounts.

5. The invention according to claim 3 wherein said drum is hollow and said means rotating said drum comprises first and second drum motors housed within and positioned adjacent each end of said drum with said first and second drum motors being attached to said first and second motor mounts, respectively.

6. The invention according to claim 5 wherein said first and second drum motors are hydraulic motors operated by third and fourth hydraulic controls located within said vehicle cab, respectively.

7. The invention according to claim 1 wherein said apparatus further comprises a platform upon which said first and second screw jacks are mounted.

8. The invention according to claim 7 wherein said platform includes at least one conveyor belt positioned beneath said drum.

9. The invention according to claim 8 wherein said apparatus further comprises a silage chute and silage discharge means positioned and operable to force silage through said chute with said at least one conveyor belt positioned adjacent said silage discharge means and operable to transport silage from a location beneath said drum to said silage discharge means.

10. The invention according to claim 1 wherein said driven vehicle includes first and second, laterally extending and vertically spaced cylindrical arms positioned forwardly of said cab, and wherein said silo unloader includes first and second, laterally spaced and aligned arm receiving means positioned rearwardly of said screw jacks and said drum, said arm receiving means being remotely operable from inside said vehicle cab to selectively and alternately engage and disengage said first and second arms on said vehicle thereby engaging and disengaging said silo unloader from said vehicle, respectively.

11. The invention according to claim 10 wherein said silo unloader further comprises a vertical mounting wall positioned rearwardly of said screw jacks and said drum, and wherein said first and second arm receiving means each comprise:
   a) upper and lower bracket members attached to and extending rearwardly from said vertical mounting wall, said upper and lower bracket members each having an arcuate recess wherein said first and second arms are positioned when in said engaged position;
   b) an elongated, U-shaped frame member having a rear wall and top and bottom walls extending perpendicularly from either end of said rear wall, said frame member further including first and second locking blades extending perpendicularly downwardly in the same direction from said top and bottom walls, respectively, and positioned in a plane spaced and parallel to the plane in which said rear wall lies, said first and second locking blades positioned adjacent and forwardly of said upper and lower arcuate recesses, respectively, said top wall including a locking pin traversing the edge thereof located opposite said rear wall;

c) a U-shaped paddle having first and second paddle halves with a slot extending therebetween, said paddle being pivotally connected to said vertical mounting wall adjacent said top wall of said frame member with said first locking blade positioned in said paddle slot; and d) means attached to said paddle and operable to selectively and alternately raise and lower said paddle about said pivot whereby said paddle bears against said locking pin in said raised position thereby raising and lowering said frame member with said raising and lowering of said paddle, respectively, with said first and second locking blades being positioned forwardly of said upper and lower recesses when said locking frame is in said lowered position.

12. The invention according to claim 11 wherein said paddle raising and lowering means comprises a hydraulic ram attached to said paddle at a first end thereof and to said vertical mounting wall at a second, opposite end thereof.

13. The invention according to claim 1 wherein said first and second screw jacks are driven by first and second hydraulic motors mounted thereto, respectively, and wherein said first and second hydraulic motors are operated by first and second hydraulic controls located within said vehicle cab, respectively.

* * * * *